United States Patent [19]

Banker et al.

[11] Patent Number: 5,485,221
[45] Date of Patent: Jan. 16, 1996

[54] SUBSCRIPTION TELEVISION SYSTEM AND TERMINAL FOR ENABLING SIMULTANEOUS DISPLAY OF MULTIPLE SERVICES

[75] Inventors: Robert O. Banker, Cumming, Ga.; Michael T. Hayashi, Aurora, Colo.; Kinney C. Bacon, Lawrenceville, Ga.

[73] Assignee: Scientific-Atlanta, Inc., Norcross, Ga.

[21] Appl. No.: 229,805

[22] Filed: Apr. 19, 1994

Related U.S. Application Data

[63] Continuation-in-part of Ser. No. 73,404, Jun. 7, 1993.

[51] Int. Cl.⁶ .................................................. H04N 5/445
[52] U.S. Cl. .......................... 348/563; 348/564; 348/10; 348/731
[58] Field of Search .................................. 348/6, 7, 8, 9, 348/10, 12, 563, 564, 565, 569, 570, 584, 731, 732; H04N 7/10, 5/45, 5/445

[56] References Cited

U.S. PATENT DOCUMENTS

| | | | |
|---|---|---|---|
| 4,894,789 | 1/1990 | Yee | 348/10 |
| 5,047,858 | 9/1991 | Aimonoya | 348/564 |
| 5,109,279 | 4/1992 | Ando | 348/564 |
| 5,128,766 | 7/1992 | Choi | 348/564 |

Primary Examiner—James J. Groody
Assistant Examiner—Michael H. Lee
Attorney, Agent, or Firm—Banner & Allegretti, Ltd.

[57] ABSTRACT

A headend of a subscription television system includes a video combiner that combines video signals from four separate programs into a composite video signal. The video signals are formatted to produce the composite video signal such that one of the programs appears in each quadrant of the displayed picture. Text data streams are then inserted into the vertical blanking interval of the composite video signal. The composite video signal is transmitted in a channel of a broadband television signal to a plurality of subscriber terminals. A plurality of virtual channels are defined by combinations of quadrants of the composite video signal and quadrants of text from the text data streams. When the subscriber selects a virtual channel, the composite video signal is tuned from the broadband signal, and the text data stream forming the text display of the virtual channel is extracted. An on-screen display uses the text data stream and the composite video signal to generate a display signal whereby text may be displayed in three quadrants and video corresponding to one of the programs may be displayed in the remaining quadrant.

10 Claims, 8 Drawing Sheets

SUBSCRIPTION TELEVISION SYSTEM AND TERMINAL FOR ENABLING SIMULTANEOUS DISPLAY OF MULTIPLE SERVICES

COPENDING AND RELATED APPLICATIONS

This application is related in subject matter to U.S. patent application Ser. No. 08/230,144, entitled "Pay-Per-View Electronic Program Guide", filed concurrently herewith and U.S. patent application Ser. No. 08/229,717, entitled "System and Method for Subscriber Interactivity in a Television System", filed concurrently herewith. The present application is a continuation-in-part of U.S. patent application Ser. No. 08/073,404, entitled "Display System for a Subscriber Terminal", filed Jun. 7, 1993.

FIELD OF THE INVENTION

The invention pertains generally to CATV or other subscription television systems, and more particularly to subscription television systems capable of transmitting and receiving channels of information, and for enabling display of a combination of services simultaneously.

BACKGROUND OF THE INVENTION

Subscription television systems can be cable television systems (CATV), multi-point, multi-distribution subscription systems (MMDS), direct-to-home (DTH) broadcast or satellite systems. The sophistication of communications systems involving subscription television is continually increasing. While providing transmission signal quality satisfactory to even the most persnickety viewers, systems currently installed have greatly improved communications capabilities and facilitate a wide variety of business arrangements between the subscriber and the system operator. For example, such features as impulse-pay-per-view, various conditional access schemes, addressable messaging systems and other text services, and electronic programming guides, to name just a few, may be supported.

In order to provide and enable operator control of such services, a multitude of apparatus is required. As a result, subscription television systems have become increasingly complex. For example, the subscriber terminals have conventionally provided the functions of tuning particular channels of the subscription system which are outside of the subscriber's television receiver capability. Further, they provide conditional access to particular subscription service through authorization of particular channels of service by descrambling.

More recently, the subscriber terminal has become user friendly by providing an interactive, on-screen display and other user functions that allow the subscriber to manipulate the cable service and his television receiver in additional ways. These features include volume control, sleep timer features, parental control capabilities, program timers for recording programs on a video cassette recorder (VCR) and other types of consumer-friendly operational features.

An advantageous example of a subscriber terminal with advanced consumer features is the Model 8600 series of subscriber terminals manufactured by Scientific-Atlanta, Inc. of Norcross, Ga. These terminals generally provide on-screen displays by combining the video signal from a selected channel with an on-screen display video signal from a video generator prior to remodulation of the combination to either Channels 3 or 4. In addition, a more sophisticated example of an on-screen display in a subscriber terminal is discussed in U.S. patent application Ser. No. 08/073,404, filed Jun. 7, 1993, entitled "Display System for a Subscriber Terminal", which is incorporated herein by reference.

Despite the recent advances, there remains a general need to provide new and additional services and features to satisfy the eclectic tastes of subscribers. In addition, there is a need to make existing systems even more user-friendly. Further, there is a need to provide a variety of services without increasing bandwidth requirements. In conventional subscription television systems, a broadband television signal having a plurality of 6 MHz frequency channels is generated at a headend and transmitted via a distribution system to subscriber terminals. Each of the 6 MHz frequency channels includes video and audio information corresponding to a discrete television (TV) program. Accordingly, to transmit four TV programs, for example, 24 MHz of bandwidth is required. When the user selects a service channel for viewing, the subscriber terminal tunes to the corresponding frequency channel, and video and audio information associated with the selected service channel is displayed.

Multi-service communications systems transmit different services over one or more different frequency channels thereby providing additional service without a corresponding increase in transmission bandwidth. Each frequency channel may carry text services in addition to video and audio information that compose a standard TV service. Therefore, to gain access to a text service, a subscriber terminal must have information to tune to the frequency channel carrying the text service and information to select the desired text service from the several text services and the TV service provided on that frequency channel.

U.S. Pat. No. 4,908,859 to Bennett, entitled "Receiver Access Interface to Service Components in Television Channel" discloses a receiver interface system that stores a service definition table, a service-to-channel map, and a channel configuration map. The service definition table defines the relation between service components and service numbers. The service-to-channel map defines the relationship between service numbers and interface channel numbers. The channel configuration map defines the relationship between frequency channels and interface channel numbers. Using these relationships, a receiver can locate and access a service selected by a user in signals transmitted over various frequency channels.

U.S. Pat. No. 5,200,823 to Yoneda et al., entitled "Virtual Channels for a Multiplexed Analog Component (MAC) Television System", contains a description of a television system for providing services, including video, audio, and text services, to remotely located subscribers over a plurality of channels. A decoder at the subscriber location receives audio, video, and text components over each physical channel. The decoder contains a mapping of each physical channel to virtual channel numbers. Each virtual channel may use a different combination of components. For example, one virtual channel may comprise linked pages of text service. A user can select a virtual channel using a selector and thereby receive the combination of service components defined by the virtual channel.

Many viewers desire to view multiple services simultaneously. In addition, subscription television operators recognize the benefits of providing multiple services simultaneously to subscribers. One known solution is to provide subscribers with two subscriber terminals in a master-slave relationship. The subscriber terminals may be linked to each other via a serial data port or other information connection. The incoming cable carrying the broadband television signal is input to an RF splitter having outputs to each of the master and slave subscriber terminals. All control functions can be performed by the master subscriber terminal. For example, the master subscriber terminal may be used to control the tuner of the slave subscriber terminal. The user can control the tuners in each subscriber terminal to tune to the different frequency channels which carry the two programs that the user wishes to view.

For example, the output of the subscriber terminals is supplied to a picture-in-picture capable television set. Accordingly, the user can view two different programs simultaneously. This arrangement would, in addition, allow a user to record one program selection on a VCR or like recording device while simultaneously viewing another program selection simply by connecting the output of one of the subscriber terminals to the recording device.

However, it is expensive for each subscriber to purchase or lease two subscriber terminals. In addition, providing the information to support two services on separate channels reduces the bandwidth available for other purposes. Accordingly, there is a need to enable subscribers to view multiple programs simultaneously without increasing the transmission bandwidth.

SUMMARY OF THE INVENTION

It is an object of the present invention to provide a subscription television system that is both highly user-friendly and capable of supporting additional features.

It is a further object of the present invention to provide a system for transmitting multi-service channels, including video, audio, and text services, and enabling display of a combination of services simultaneously.

It is a further object of the invention to provide a system for transmitting a channel of service, including a composite of several video services and one or more text services, and enabling display of a combination of the video services and text services.

It is a further object of the invention to provide a subscriber terminal apparatus that his highly user-friendly and that is capable of supporting additional features.

It is a further object of the present invention to provide a subscriber terminal for receiving multi-service channels, including video and text services, and enabling display of a combination of services simultaneously.

It is a further object of the invention to provide a subscriber terminal for receiving a channel of service, including a composite of a several video services and one or more text services, and enabling display of a combination of the video services and text services.

In accordance with the present invention, a subscription television system includes a headend that transmits a broadband television signal having multiple channels of information via a distribution system to at least one subscriber terminal remote from the headend. The headend includes a video combiner that combines several video signals into a composite video signal. Each of the video input signals to the video combiner corresponds to a different video program. The headend additionally includes a circuit that inserts text data streams into the composite video signal. For example, text data streams may be inserted into the vertical blanking interval or carded as amplitude modulation of the sound carder of the composite video signal. The composite video signal is then modulated onto a channel of the broadband television signal which is transmitted to the subscriber terminal. Moreover, additional information, for example text data streams, may be transmitted over a dedicated out-of-band channel, for example, at 108.2 MHz.

The subscriber terminal includes a selector for selecting a virtual channel and a control signal generator for generating tuning control signals, text data extraction control signals, and video program control signals corresponding to the selected virtual channel. A tuner tunes to the channel of the broadband television signal carrying the composite video signal responsive to the tuning control signals. Processing circuitry processes the composite television signal received from the tuner. The processing circuitry includes a text data extractor that extracts a text data stream from the composite video signal in accordance with the data extraction control signals.

The subscriber terminal additionally includes an on-screen display control that generates a video output display signal. When the video output display signal is input to a standard television receiver, the television displays text information from the extracted text data stream and video information corresponding to the video program determined from the video program control signals.

The composite video signal may be formatted such that the picture is divided into quadrants, with a different one of four programs in each quadrant. For example, the on-screen display control can produce a video output display signal such that one of the four programs appears in one quadrant of the displayed picture and text information appears in the other three quadrants of the displayed picture. Consequently, from a single channel of the broadband television signal, several multi-service virtual channels may defined, each having a different combination of video and text.

In addition, the present invention provides a subscription television terminal that receives a broadband television signal having a composite video signal on one channel thereof. The composite video signal is formed from the video signals of a plurality of video programs, and includes text data streams. For example, the composite video signal may be formed from video signals of four different video programs. The composite video signal is formatted such that the four video programs would appear without distortion in a respective quadrant of the television display. The text data streams may be inserted into the vertical blanking interval of the composite video signal.

The subscriber terminal includes a memory that stores a mapping of a virtual channel to the channel of the broadband television signal that the composite video signal occupies. In addition, the memory stores a mapping of the virtual channel to a combination of a text data stream and a portion of the composite video signal that corresponds to one of the video programs.

When a selector selects the virtual channel defined in memory, a tuner tunes to the channel of the broadband video signal that the composite video signal occupies as determined from the mapping in memory. Accordingly, the composite video signal may be applied to processing circuitry. In the processing circuitry, the text data stream corresponding to the selected virtual channel can be extracted. The extracted text data stream and the composite video signal are then supplied to an on-screen display control which produces a video output display signal therefrom. When applied to a standard television receiver, the video output display signal produces a picture having both text information from the extracted data stream and video information from the portion of the composite video signal corresponding to the video program defined by the virtual channel.

Accordingly, the present invention enables display of multiple services of text and video simultaneously without requiring an additional tuner and without occupying more than a single band of the broadband television signal. Furthermore, the present invention enables several different virtual channels to be defined from the composite video signal. Accordingly, numerous different services may be provided to the subscriber without a corresponding increase in bandwidth.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENTS

Figure 1A:
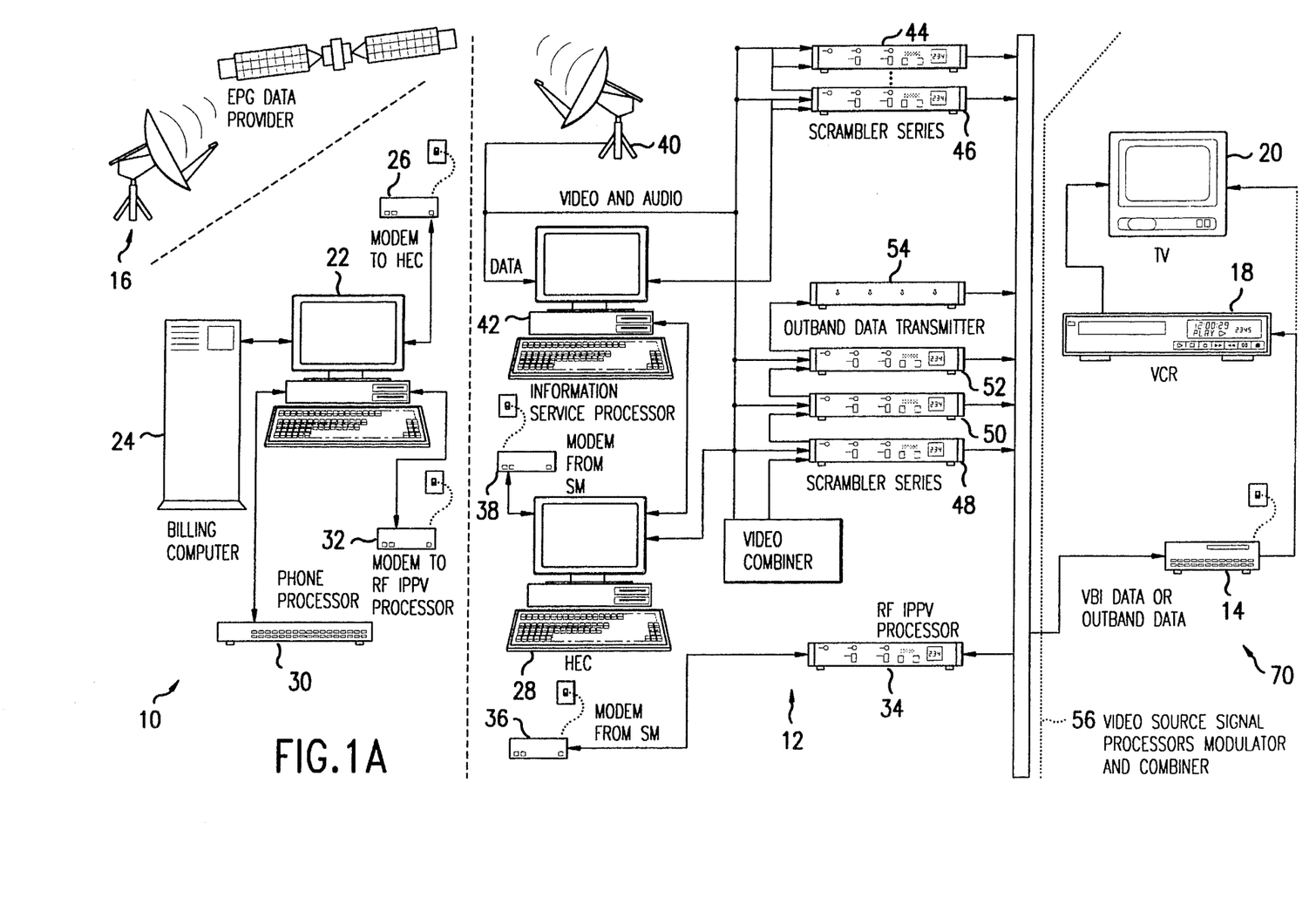
FIG. 1A is a detailed diagram of a subscription television system according to the present invention.

FIG. 1A is a detailed diagram of a subscription television system according to the instant invention. The system of FIG. 1A is intended to serve as an example and should not be construed as limiting the invention. A central control center 10 orchestrates the operation of the subscription television system. Central control center 10 is often associated with the central office of a multi-service operator and may communicate with and control multiple headends, such as headend 12. Headend 12 provides a subscription television service to a local area, for example, a city or a group of cities or towns.

A subscriber terminal 14 is also shown and may be located in a subscriber's home or business location 70. Subscriber terminal 14 is coupled to VCR 18 and television 20. It should be clear that the subscriber terminal 14 can also be coupled directly to the television 20 as shown by dotted line. Information may be communicated between central control center 10 and headend 12 by any known means including telephone networks, satellite transmissions, optical fibers, coaxial cable, other transmission lines, telecommunication apparatus, etc. or any combination of known means. Headend 12 may be coupled to subscriber terminal 14 via a subscription television distribution system 58, for example coaxial cables, satellite, optical fibers, telecommunication apparatus, or other known means or combinations of known means.

Central control center 10 includes a system manager 22 that directs the other components of central control center 10. System manager 22 preferably comprises a Scientific-Atlanta system manager 10 network controller. Central control center 10 may, for example, provide billing services for the provider, including billing for pay-per-view events. A billing computer 24 stores billing data and may also format and print bills. Modems 26 and 38 allow data transmissions between system manager 22 and headend controller "HEC") 28 of the headend 12. HEC 28 preferably comprises a Scientific-Atlanta Model 8658 headend controller. For example, authorization data may be transmitted from system manager 22 to HEC 28. HEC 28 formats the authorization data and transmits it to subscriber terminals either in-band through scramblers 48, 50 or 52 or out-of-band through outband data transmitter 54. Billing data from the subscribers can be received through either phone processor 30 or modem 32.

Subscriber terminal 14 can either transmit billing data over a telephone line directly to the phone processor 30 or back up the cable to RF IPPV processor 34. If the data is sent to RF IPPV processor 34, it is sent by modem 36 associated with RF IPPV processor 34 to modem 32 associated with system manager 22. System manager 22 accumulates the billing data from phone processor 30 and modem 32 and provides it to billing computer 24 so that customers may be billed for their program services.

An electronic programming guide (EPG) data provider 16 supplies television schedule data to headend 12 via satellite receiver 40 or by other known means such as, but not limited to, cable, optical fiber, and telecommunications. This data includes program information arranged by time and channel. One such service is offered by Insight Telecast Inc. The Insight service provides extensive television program listings. Cable operators can purchase this data and provide it to their subscribers.

Figure 2:
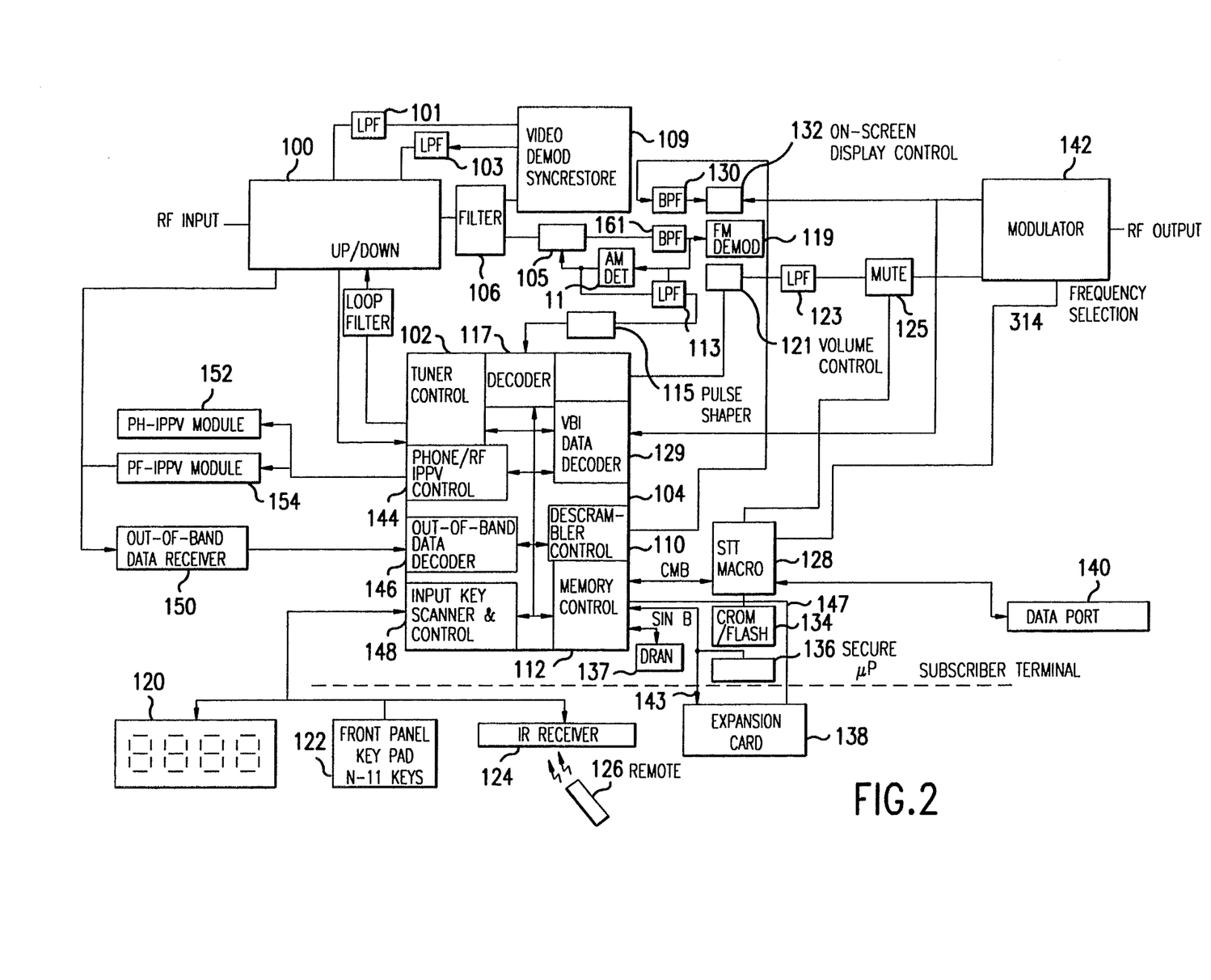
FIG. 2 is a detailed black diagram of one of the subscriber terminals shown in FIG. 1A.

The EPG data received by satellite receiver 40 is passed to information service processor 42. Information service processor ("ISP") 42 may also receive text data for transmission to subscribers. The text data may include weather information, sports scores, messages, etc. and may be provided by an information service provider, or accumulated or generated by the system operator. ISP 42 is responsible for receiving the EPG data, as well as the other data, formatting it, and transmitting it to the subscriber terminals. ISP 42 provides data to scramblers 44 and 46. Of course, the actual number of scramblers to which the ISP provides data may depend on the amount of data to be transmitted, the number of channels on which the data is to be transmitted, and the frequency at which one wishes to supply the data to the subscriber terminal. The two scramblers 44 and 46 in FIG. 2 are for example only. Scramblers 44 and 46 place data in-band for transmission to subscribers, along with scrambling an associated television signal. The EPG data and text data in a preferred embodiment are placed in the vertical blanking interval, but may also be placed elsewhere in the 6 MHz channel of an NTSC television signal. While an NTSC (U.S. standard) television signal is described by way of example in this description, the signal may be PAL, SECAM, a digital video compressed signal, or a high definition television signal having a wider bandwidth. For example, the data could be placed on the sound carder or transmitted over a separate out-of-band channel (not shown). Additional information concerning ways to transmit the data may be obtained from U.S. patent application Ser. No. 07/983,766, entitled "In-Band/Out-of-Band Data Transmission Method and Apparatus for a Television System", incorporated herein by reference, U.S. patent application Ser. No. 07/799,987, entitled "Method and Apparatus for Message Information", filed Nov. 29, 1991, which is incorporated by reference, and U.S. patent application Ser. No. 07/800,241, entitled "Method and Apparatus for Tuning Channels in a Subscription Television System having In-Band Data", filed Nov. 29, 1991, which is incorporated by reference. Also, further information concerning EPG and pay-per-view processing can be obtained from U.S. patent application Ser. No. 08/230,144, entitled "Pay-Per-View Electronic Programming Guide", filed Apr. 19, 1994 and incorporated by reference.

The EPG data received by satellite receiver 40 will often be very extensive, containing data for programs up to one or two weeks in advance. If all this data is to be transmitted to subscriber terminal 14, the terminal must be able to store the data in its memory. To store that much information requires a significant amount of memory which would greatly increase terminal costs. Thus, ISP 42 can select portions of the data to be transmitted to subscribers. ISP 42 receives the EPG data, selects the portion to be transmitted to subscribers and passes that portion to a scrambler, e.g. scrambler 44 and/or 46. Not only may ISP 42 select portions of the EPG data, but it may also add data on local stations not covered by EPG data provider 16. ISP 42 may also reformat the data in such a way as to make it more pleasing to the subscribers.

Data is most conveniently tagged as short term or long term, for example, to scramblers 44, 46. Scramblers 44, 46 send more immediate data, for example, the next several hours of EPG data more frequently (at a higher repetition rate) than long term data. For this purpose, scramblers 44, 46 are provided dynamic random access memory (DRAM), for example, at 256 kbytes, 512 kbytes, or 1 Mbyte, for storage of data.

As discussed above, ISP 42 may also obtain text data from an information service provider, such as a stock quote service, or generate text data locally. The text data may received via satellite, dial up modem, direct connect modem, direct connect to system manager, or other known means. The text data may either be transmitted as received or reformatted by ISP 42, then transmitted to a scrambler (44 or 46) for transmission to subscribers as described above.

ISP 42 also passes data to HEC 28, which controls scramblers 48, 50 and 52, and also outband data transmitter 54. The scramblers 48, 50 and 52 scramble television signals and may also insert in-band data. The television signals may be received via satellite receiver 40, as shown, or by other means such as local broadcast, microwave, coaxial cable, optical fibers, telecommunication apparatus, etc. or a combination thereof. Before applying the television signals to the scramblers, the video portion of several television signals may be applied to a video combiner 64 to produce a single composite video signal. This will be described in greater detail in connection with FIGS. 1B and 1C. The audio portion of the television signals may be applied directly to the scrambler. Of course, video combiners may supply the input to any number of scramblers. Further, scramblers 48, 50, and 52 may contain memory for storage of data for transmission. Scramblers 44, 46, 48, 50, and 52 may be Scientific-Atlanta Model 8656 line scramblers. Also data may be transmitted on non-scrambled channels via data repeater (not shown) such as a Model 8556-100 data repeater.

The outband data transmitter 54 transmits data on a separate carrier, i.e., not within a 6 MHz channel, for example at 108.2 MHz. The transmitted data may be, for example, descrambling information. In a preferred embodiment, data is inserted in each vertical blanking interval to indicate the type of scrambling employed in the next video field. Further, authorization information could be transmitted; this information would authorize the reception of channels or programs. Some of the information transmitted would be global, i.e., every subscriber would get it. For example, the descrambling information could be a global transmission. Note that just because each subscriber receives the descrambling information does not mean that each subscriber terminal can descramble the received signal. Rather, only authorized subscriber terminals would actually be capable of descrambling a received signal.

On the other hand, data transmissions may be addressed transmissions. Authorization data would normally be addressed to individual subscribers or groups of subscribers. That is, when transmitted, the data will have an address (for example, a subscriber terminal serial number) associated with it. The subscriber terminal addressed will receive the data and respond accordingly. Other subscriber terminals will ignore the data. The outputs of scramblers 44, 46, 48, 50, 52 and outband data transmitter 54 are passed to any necessary processing equipment, such as signal processors, modulators and combiners. These elements are generally indicated as block 56 and do not form a part of the instant invention. A distribution system 58 leads to a subscriber location 70.

At the subscriber location 70, terminal 14 is found. In FIG. 1A, for example only, one subscriber terminal is shown. Typically, at given location only one terminal will be found. However, two terminals may be provided FIG. 1A to indicate that different types of terminals may be used in the same system as discussed in greater detail below. At the subscriber location, subscriber terminal 14 is connected to the subscriber's video equipment, including, for example, a VCR 18 and television 20.

Figure 1B:
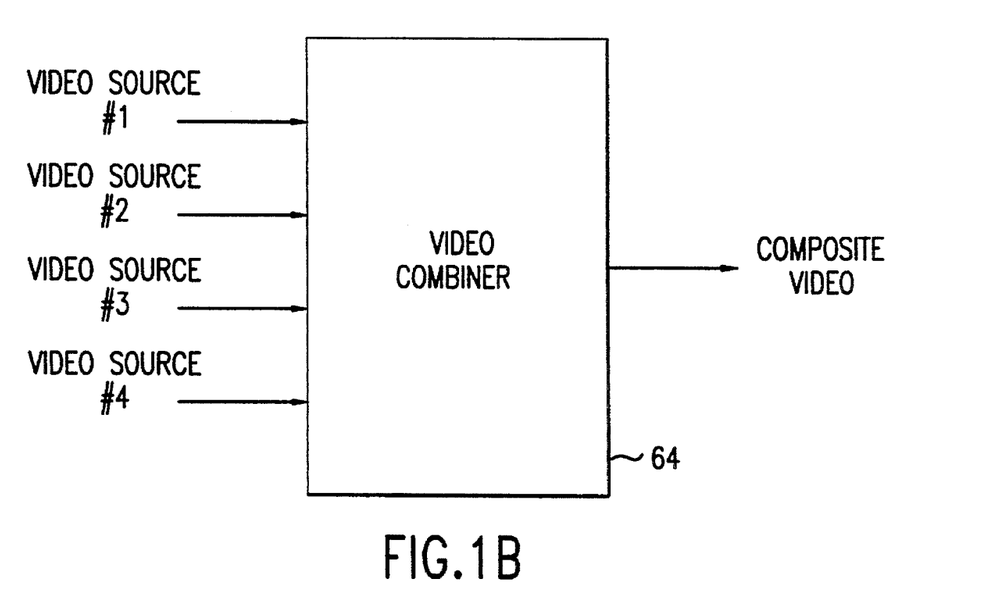
FIG. 1B illustrates an embodiment of a video combiner according to the present invention.

As illustrated in FIG. 1B, the video combiner 64 includes an input from each of, for example, video source #1, video source #2, video source #3, and video source #4. Of course, any number of video sources may be applied to video combiner 64 consistent with the present invention. Video combiner 64 reformats the video sources #1–#4 to produce a composite video signal. For example, for the first half of each field of the composite video signal, the video information from the video source #1 may comprise the first half of each line of active video and video information from the video source #2 may comprise the second half of each line of active video. For the second half of each field, the video information from the video source #3 may comprise the first half of each line of active video and video information from the video source #4 may comprise the second half of each line of active video. A control signal from HEC 28 may be provided to select the order in which the video signals are combined to produce the output from the video combiner 64.

Figure 1C:
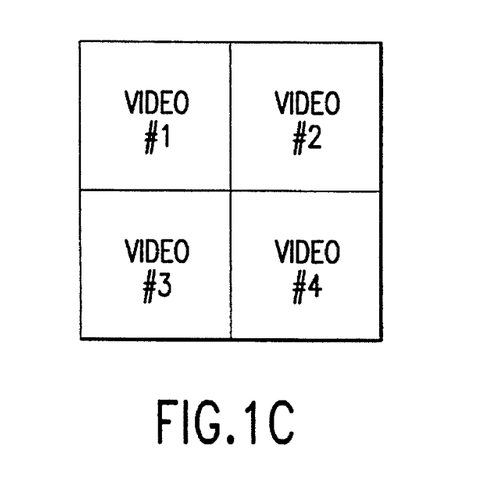
FIG. 1C provides a representation of a display of the composite video signal output from the video combiner illustrated in FIG. 1B.

FIG. 1C provides a representation of a display of the composite video signal discussed above. As shown in FIG. 1C, the overall picture is a composite of the pictures of the four individual video sources #1–#4, each picture located in a separate quadrant of the overall picture. Consequently, the aspect ratio of each picture remains intact and distortion is minimized. One or more audio signals may be added to the composite video signal at the scrambler depending upon transmission limitations. The composite video signal may additionally be multiplexed with one or more text data streams, for example, by inserting the text data streams in the vertical blanking interval of the video. Of course, the text data streams should not be considered limited to merely data representing text, but may include other data information, such as graphics data or control data, for example. It is merely the manner in which the data is interpreted that determines its content.

As is clear from the above description, a single composite video signal includes the information equivalent of four video signals, but is transmitted to subscriber terminals utilizing only 6 MHz of bandwidth. However, the composite video signal transmitted from the headend is not limited merely to video information, but may include text data streams and audio signals, among other information. This additional information would generally be included after output from the video combiner 64.

Furthermore, the ISP 42 may receive data transmitted from a subscriber via a return path, e.g. RF IPPV Processor 34, via modem, optical transmitter, etc. The data may comprise text data or data representing other information forms, such as audio information and/or video image(s) obtained from a camera at the subscriber's premises, for example, built into the subscriber terminal 14. The data received from the subscriber may be associated with the address of another subscriber or group of subscribers. The ISP 42 may transmit this data to the scramblers in a manner similar to message data. Accordingly, one subscriber would be able to transmit messages to another subscriber or to a group of other subscribers. If the data represents a video image, for example, occupying 1.5 MHz of bandwidth, the subscribers receiving the message can obtain an image of the subscriber sending the message and/or audio and/or text information, all of which forming the message. In the manner discussed below, such message information may be overlayed onto the picture of the channel selected for viewing by the receiving subscribers.

Referring to FIG. 2, a detailed block diagram of one of the subscriber terminals will now be described. The broadband television signal from the signal distribution system 58 is received at the input of up/down converter or tuner 100. To provide for picture-in-picture capabilities or simultaneous watch and record, for example, multiple tuners (not shown) may be provided for tuning to more than one television channel simultaneously. An out-of-band data receiver 150 is also coupled to the broadband input. Conventionally, the up/down converter 100 may include an input filter, such as a diplexer, to separate the 108.2 MHz out-of-band signal and the broadband television signal. The up/down converter 100 can be tuned to a predetermined data-carrying channel for receiving in-band video and audio data when used by the subscriber for recording or viewing a selected channel. The channel may be predetermined from the system manager 22 and, by one of the data transmission methods described herein, the predetermined channel identification can be stored in the subscriber terminal 14.

When in use, the up/down converter is tuned according to a channel selected by a subscriber via a user interface having an infrared (IR) receiver 124, remote control 126, and/or terminal keypad 122. Up/down converter 100 uses a phase locked loop under the control of a tuning control 102 to convert the selected or predetermined default RF channel signal to a 45.75 MHz intermediate frequency signal. A multifunction control circuit (MCC) 104 is linked to up/down converter by a bidirectional link to the tuner control 102. The MCC 104 is preferably an application specific integrated circuit (ASIC) combining many subscriber terminal control and data handling functions into a single package. Of course, the ASIC may include any combination of individual control circuits. Alternatively or in addition, other control circuitry may be used, for example a microprocessor.

The bidirectional link may include one path for tuning and a return path for feedback control of the tuning process. A feedback signal for automatic gain control and one for automatic frequency control are transmitted to the up/down converter 100 through filters 101, 103, respectively from a video demodulator 109.

A filter, for example a SAW filter 106, filters the IF channel signal to split the signal into separate video and audio portions for processing. The video portion is demodulated and descrambled by the video demodulator 109 under the control of the descrambler control 110 of the MCC 104. For example, the video demodulator 109 may perform sync restoration (one form of descrambling of the video signal) for sync suppression scrambling. The video signal then passes through a bandpass filter 130 to an on-screen display control 132 where inverse video inversion (descrambling) takes place if necessary. The descrambling of the video portion, whether sync suppression, sync inversion, video line inversion, etc., is under the control of the descrambler control 110 of the MCC 104. The descrambler control 110 provides the necessary timing signals, inversion axis levels, and whether the video is inverted or not to the on-screen display control 132 and supplies the necessary timing, restoration levels, and identification sync pulses to be restored to the video demodulator 109. The descrambler control 110 receives such descrambling information either from pulses as in-band audio data or from data modulated on the video during the vertical blanking interval or via out-of-band signals.

In the other path, the audio signal is converted from the 41.25 MHz IF carrier to the intermodulation frequency of 4.5 MHz by a synchronous detector 105. Feedback for automatic gain control of detector 105 is supplied from the output of bandpass filter 161. The audio signal may then be demodulated by an FM demodulator 119. An amplitude modulation detector 111 performs pulse detection to recover the in-band audio data which are amplitude modulated onto the audio carrier. The received in-band pulses are supplied to an in-band audio data decoder 117 of MCC 104 for processing after being shaped by pulse shaper 115. The in-band data, except for descrambling data, is stored in DRAM 137 for buffering. Descrambler control 110 accesses descrambling data directly for the video descrambling operation.

Volume control of the audio signal is performed under control of a volume control 41 and the microprocessor 128 as described in U.S. Pat. No. 5,054,071, incorporated herein by reference. After volume control, the audio signal is passed through a low pass filter 123 and a mute switch 125. The output of the mute switch 125 is applied to a modulator 142.

The MCC 104 receives the video signal after demodulation and descrambling and detects the in-band video data from the VBI of the signal with a VBI detector. The in-band video data is transmitted at a frequency on the order of known teletext systems, such as 4.0 megabits per second. However, the invention should not be considered limited in this respect. A data clock provides an appropriate sampling frequency higher than the Nyquist rate according to well known techniques. The VBI data decoder 129 stores the data in DRAM 137 prior to processing by the microprocessor. Additional details of the VBI data decoder will be discussed in connection with FIG. 3.

The on-screen display control 132 selectively generates on-screen character and graphics displays in place of or overlaid on the video signal. For example, the information stored in DRAM 137 by the VBI data decoder 129 may be read out to the on-screen display control and used to generate on-screen characters and/or graphics. The modulator 142 combines the video signal from the output of the on-screen display control 132 and the audio signal from the output of the mute control circuit 125 and converts the combined signal to the channel frequency selected by the microprocessor 128, such as channel 3/4 for NTSC. The combined and remodulated signal is supplied as an RF output to a television receiver in a well known manner.

A control microprocessor 128 controls the overall operation of the subscriber terminal 14. The subscriber terminal communicates to and controls the microprocessor 128 through interactive user interface with an on-screen display. The user interface includes keyboard 122 on the front panel of the subscriber terminal 14 and the remote control 126 which generates subscriber control signals for channel tuning, volume level control, feature selection, and the like. These subscriber commands are decoded by an input scanner and control 148 of the MCC 104. The remote IR receiver 124 of the user interface receives the commands from the IR or other remote control 126, as is well known in the art, and provides commands to the microprocessor 128. The user interface may additionally include a display 120, for example, a four-digit, seven segment LED display, which displays the tuned channel numbers and diagnostics.

When the keypad 122 or remote control 126 is utilized to select a command, the microprocessor 128 operates to execute the command. The subscriber terminal interacts with the subscriber by providing numerous on-screen displays which assist in the operation of the terminal. The on-screen displays provide information and prompts to guide the subscriber through many of the complex features of the terminal. For example, the on-screen display may implement a menu page structure for providing screen-by-screen directions for using the subscriber terminal and its features.

The descrambler control 110 of the MCC 104 utilizes recovered descrambling data to generate appropriate control signals, for example, inversion control and equalizing, sync restoration or regeneration for descrambling, or otherwise restoring the input baseband television signal. A secure microprocessor 136 determines whether the descrambler control 110 of the MCC 104 carries out descrambling on a particular channel or what form of descrambling is required at a particular time by interpreting the authorization and control data downloaded from the system manager 22 (by any of the three data transmission schemes discussed herein, out-of-band, in-band audio or in-band video) into the internal non-volatile memory (NVM) of the device. The NVM in the secure microprocessor 136 stores secure data, for example, authorization data, scrambled channel dam, some terminal configuration data and other required data.

The control processor 128 operates by running a control program which preferably is partially stored in a read-only memory internal to the processor and partially stored in an NVM, such as Flash EPROM memory 134. In addition, the control program of the microprocessor 128 may also reside in the NVM of an expansion card 138. The control program may be downloaded from the headend 12 in the manner discussed in U.S. patent application Ser. No. 07/983,909, entitled "Reprogrammable Subscriber Terminal", filed Dec. 1, 1992, which is incorporated by reference. The microprocessor 128 communicates with the NVM 134, 138 via a memory bus 141 which has data, address, and control lines. The microprocessor 128 also controls the data decoders 117, 129 and 146, volume control 41, on-screen display control 132, and the tuner control 102, descrambler control 110 and input key scanner and control 148 via commands through MCC 104 and control processor bus (CMB) 131. The microprocessor 128 directly controls the mute switch 125 and the output frequency selection of the modulator 142. The microprocessor 128 includes additional capacity for other auxiliary device communications and control through a data port 140. For example, the data port may accommodate an IR blaster for VCR control via an on-screen menu, an additional subscriber terminal for dual tuner operation, or connection to a digital video subscriber terminal.

The subscriber terminal 14 may receive addressable and global data, other text data, and descrambler data transmitted from the headend 12 via the in-band vertical blanking interval (VBI). Alternatively or in addition, addressable and global data may be transmitted in a separate out-of-band data carrier if an out-of-band receiver is provided. The memory control 112 permits data coming from the three data decoders 117, 129, and 146 to be placed in a volatile memory, for example DRAM 137. There it can be accessed by the control microprocessor 128 via the CMB 131. Additional details are discussed below. The MCC 104 also distributes control instructions from the control microprocessor 128 to other parts of the MCC 104 to provide operation of the rest of subscriber terminal 14. The MCC 104 additionally connects to a secure microprocessor bus (SMB) 143 which permits communications between the secure microprocessor 136 and other portions of the subscriber terminal 14. The SMB 143 is further coupled to the expansion card 138 to provide renewable security.

The memory control 112 and microprocessor interfaces of the MCC 104 are the central communications facility for the control microprocessor 128 and the secure microprocessor 136. The memory control 112 receives requests from the microprocessors 128, 136 and other controls and data decoders to write to memory or read from memory. It resolves contentions for memory transfers, giving priority to real time applications and the micro-processors, and schedules the data flow. The microprocessors 128, 136 communicate through internal registers of the MCC 104 with the memory control 112 and other portions of the MCC 104.

The expansion card 138 may be a printed card which contains memory and/or secure microprocessor components, which can be plugged into a connector 200. The connector 200 can be configured such that, when it receives the expansion card 138, the expansion card is flush with top cover. The connector 200 electrically extends the control microprocessor memory bus 141 and the secure microprocessor bus 143 to the expansion card 138. Additional program or data memory, renewed security, or any other application supported by microprocessors 128, 136 can be provided by the expansion card 138. In addition, circuitry coupled to microprocessor 126 may be provided for detecting whether or not the expansion card is installed. Thus, the subscriber terminal 14 may be controlled in accordance with information contained on the expansion card 138 when installed and in accordance with internal software when the expansion card 138 is not installed. Additional details concerning the expansion card 138 may be obtained from U.S. patent application Ser. No. 07/983,910, entitled "Subscriber Terminal with Plug In Expansion Card", which is incorporated herein by reference.

The subscriber terminal may optionally include an impulse-pay-per-view (IPPV) module of the telephone type 252 or of the RF-IPPV type 154. Alternatively, such reverse path information may be transmitted via an optical link, or other known means. The IPPV module allows subscribers to request authorization of their subscriber terminal to receive pay events such as pay-perview events or near-video-on-demand (NVOD) transactions, store the data associated with the purchase of the event in the NVM of the secure microprocessor 136, and then transmit the data to the system manager 22 via the telephone return path or the RF return path via the signal distribution system.

Furthermore, "interactive television" information may be transmitted to the system manager 22 via the RF or telephone IPPV module or other reverse path transmission. In such case, the subscriber terminal may receive information defining a menu which may be immediately displayed. When the user responds to a menu prompt, the resulting information may be immediately transmitted as return data. For example, the user may respond to a poll by entering information to the keyboard. The results of the poll may be determined at the head end and later reported to the subscriber terminals. Additional details concerning the interactive television features can be obtained from U.S. patent application Ser. No. 08/229,717, filed Apr. 19, 1994 and incorporated herein by reference.

Figure 3:
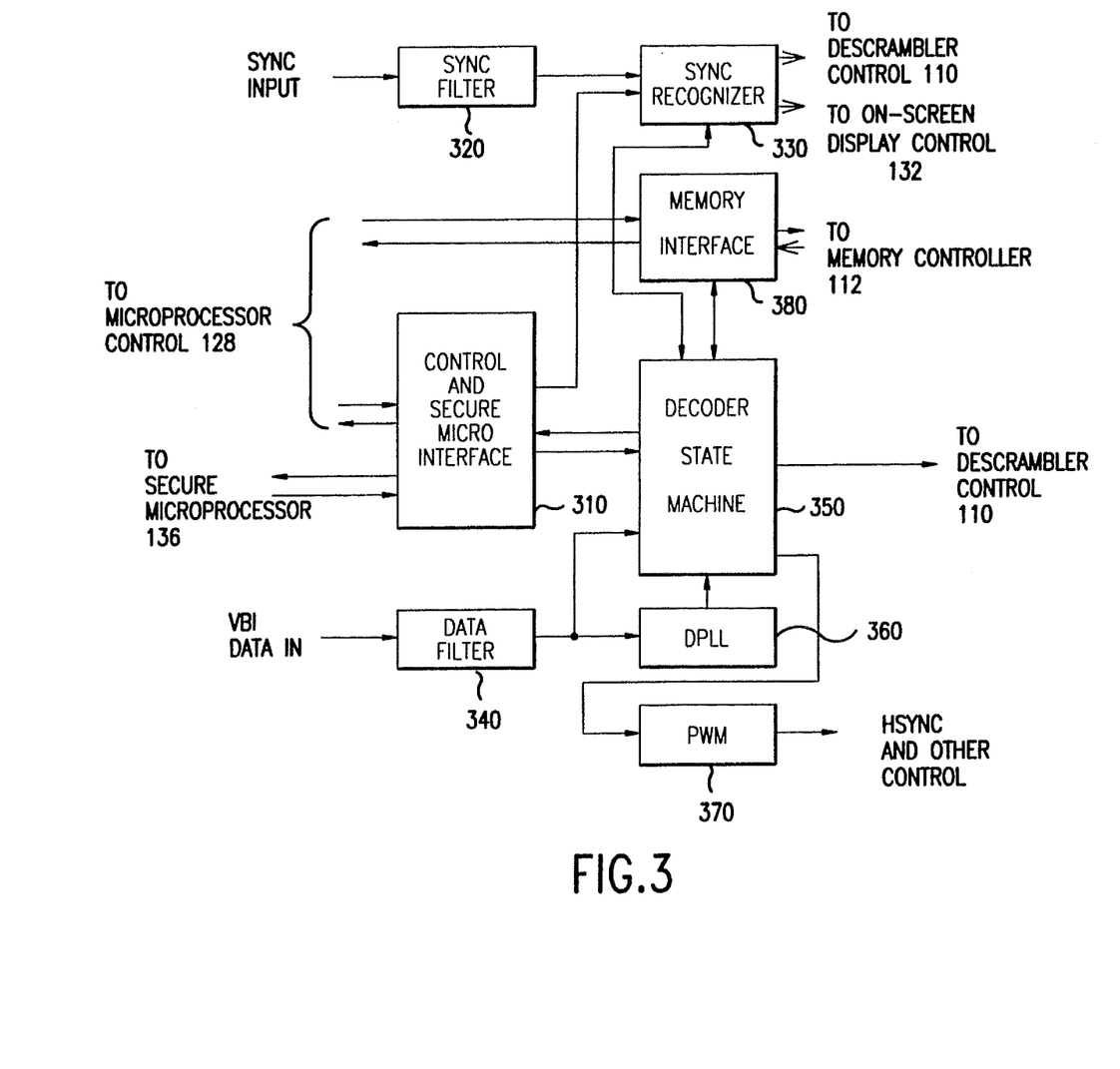
FIG. 3 illustrates an embodiment of the VBI data decoder shown in FIG. 2.

FIG. 3 illustrates the VBI data decoder 129 in greater detail. The VBI data decoder 129 performs two main functions. The first function is to process all scrambled transactions that are sent to the subscriber terminal. Processing a transaction can includes digital filtering, error detection, error correction, decryption and storage of the data. The second function is to determine the line number and field number of the video. The line and field numbers are used by other components of the subscriber terminal, such as the descrambler control 110 and the on-screen display control 132.

The control and secure microprocessor interface 3 10 provides connection between the registers for the VBI decoder 129 and control microprocessor 128 and secure microprocessor 136. The control microprocessor 128 interfaces with the VBI decoder 129 to control operations thereof. The secure microprocessor 136 provides the VBI decoder 129 with information required to perform descrambling and information recognition functions. For example, the secure microprocessor 126 may provide a present encryption seed, the next encryption seed, and the subscriber terminal address.

Sync filter 320 removes noise spikes from the sync input signal. The sync filter may be a running average circuit that averages the state of sync input signal within a window that contains a predetermined number of samples. The output of sync filter 320 is supplied to sync recognizer 330. If non-scrambled or restored video is present, the sync recognizer 330 detects horizontal sync pulses, vertical sync pulses and equalizing pulses, and determines the video line number and the field from the output of sync filter 320. In addition, sync recognizer 330 outputs a signal to decoder state machine 350 to indicate whether the video is either non-scrambled or restored. Output signals are also supplied to the descrambler control 110 and the on-screen display control 132. The pulse width modulator (PWM) 370 indicates the beginning of the horizontal sync pulse and other control pulses to circuitry external of the MCC 104.

The data filter 340 removes noise spikes from the VBI data signal and outputs a filtered signal to decoder state machine 350 and digital phase locked loop (DPLL) 360. DPLL 360 tracks the filtered VBI data and generates a "strobe" signal at the center of each bit cell. The strobe signal is used to determine when the VBI data should be sampled. The decoder state machine 350 performs the processing of the VBI data. The memory interface 380 performs two functions. First, it serves as the interface between the decoder state machine 350 and the internal RAM. Second, it sends data to the memory controller 112, which stores the data into an external DRAM 137.

The decoder state machine 350 identifies the VBI transactions from the scrambler at the headend and processes the descrambler transactions and the subscriber terminal transactions. In general, descrambler transactions can occur, for example, on NTSC lines 9 through 21. Processing a transaction can include error correction, decryption, cyclic redundancy code (CRC) computation and storage into DRAM 137.

To detect a transaction, the decoder state machine loads the bits of the transaction into a shift register. The filtered VBI data is connected to the input of a shift register. When the "strobe" pulse from DPLL 360 goes high, the shift register shifts its contents and latches the value at its input. If the DPLL 360 is locked, the value at the input of the shift register will be a sample from the center of a bit cell, not an undesirable sample from between two bit cells.

The detected serial bitstream may be stored temporarily in RAM before it is written to the DRAM 137. This may be required if the memory controller 112 is servicing other modules, such as the on-screen display 132. The data is then read from the RAM and sent to the memory controller 112 which writes the data into DRAM 137. The decoder state machine 350 supplies the address, the data from RAM and timing signals to the memory interface 112. Data transfers between internal RAM and memory controller 112 are accomplished via memory interface 380.

Subscriber terminal transactions (also called in-band VBI transactions) can appear, for example, on any line that does not contain a vertical sync pulse (e.g., any line except for lines 4, 5, and 6). After the decoder state machine 350 detects a descrambler transaction, it waits until a place where the "pedestal" might be present. Strobe pulses from the DPLL 360 latch the bits of the transaction into a shift register.

At this time, the decoder state machine may determine from a recovered control bit whether the transaction is addressed or global. If the transaction is addressed, the decoder state machine 350 compares the subscriber terminal address in the data to the subscriber terminal address stored in a register. If the addresses do not match, the transaction is ignored. If there is a match, the received data is decrypted and stored in the internal RAM. Finally, the decoder state machine 350 reads the data from the RAM and sends it to the memory controller 112 which writes the data into DRAM 137. The decoder state machine 350 supplies the address, the data from RAM, and timing signals to the memory interface 112. Data transfers between internal RAM and memory controller 112 are accomplished via memory interface 380.

A brief description of the on-screen display will now be provided. As noted above, the on-screen display is implemented from the on-screen display control 132. The screen may include for example 16 lines with either 45 characters per line, 24 characters per line, or a combination of both. The cubes used to display text can vary in size. In a preferred embodiment, the size of the cubes must conform to the following inequality:

$$(height \times width)/2 < 256$$

In this case, there is a minimum of seven pixels and a maximum of thirty-two pixels for the width of the cube. There is a minimum of six pixels and a maximum of sixty-four pixels for the height of each cube. Underlining can be activated and deactivated on a per-cube basis. The background display may take, for example, any of 4096 different colors, including transparent. Characters or graphics overlayed onto active video may be surrounded by a block of black background to enable easy distinction from the video. Additional details of an on-screen display control may be obtained from U.S. patent application Ser. No. 08/073,404, entitled "Display System for Subscriber Terminal", which is incorporated herein by reference, and U.S. patent application Ser. No. 07/800,836, entitled "Method and Apparatus for Providing an On-Screen User Interface for a Subscription Television Terminal", filed Nov. 29, 1991, which is incorporated by reference.

Figure 4A:
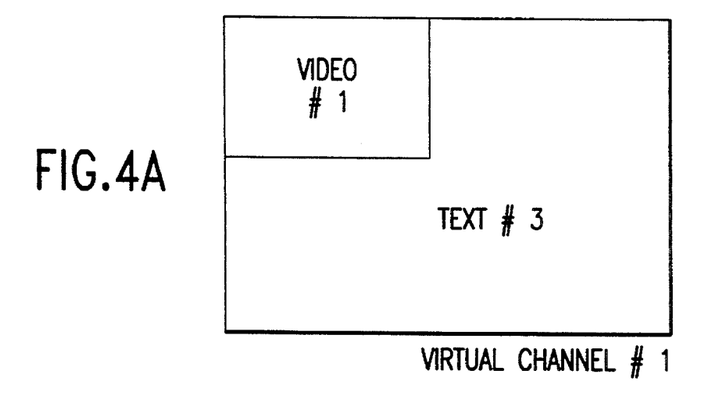
FIG. 4A illustrates the display obtained from a virtual channel composed of video #1 and text stream #3.
Figure 4B:
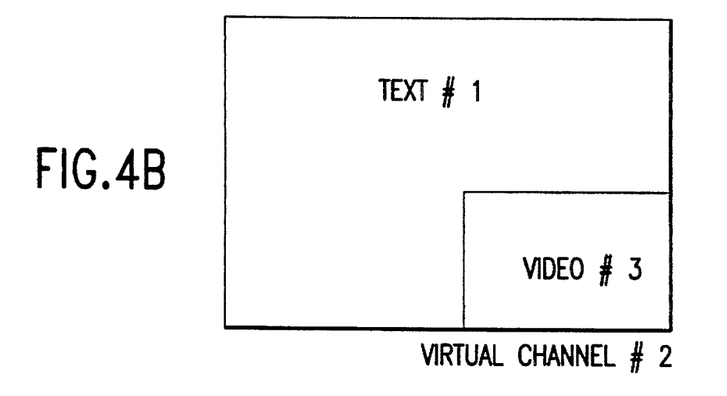
FIG. 4B illustrates the display obtained from a virtual channel composed of video #3 and text #1.
Figure 4C:
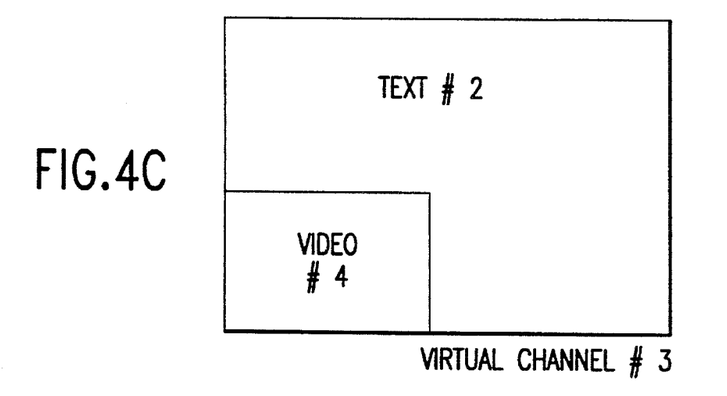
FIG. 4C illustrates the display obtained from a virtual channel composed of video #4 and text stream #2.

FIGS. 4A–4C illustrate a feature of the present invention whereby a plurality of multi-service virtual channels may be provided from a single 6 MHz bandwidth physical channel. In the illustrated example, multiple different virtual channels can be defined from a composite video signal having one or more text streams multiplexer in the vertical blanking interval (VBI) thereof. For example, three text streams may be multiplexed into the VBI of the composite video signal at the headend. The three text streams may correspond to, for example, local weather forecasts, daily financial information such as Dow Jones averages and stock prices, advertisements, and local news or events, among other possibilities. The composite video signal may correspond to, for example, commercials, movie or television previews, infomercials, or classified advertisements, among other possibilities.

The subscriber terminal may provide for virtual channels as follows. Memory, such as NVM, stores information sufficient to extract the programming corresponding to each virtual channel from the broadband signal received from the headend 12. For example, the NVM may store a mapping of virtual channel numbers to one of the channels of the broadband television signal. In addition, the memory may store a mapping of virtual channel number to particular information transmitted in that channel. For example, this mapping may identify in the channel a particular data stream, a video signal, a audio signal, or a combination thereof.

When the subscriber makes a selection, the control microprocessor 128 accesses the memory to obtain the information corresponding to the selected channel. The control microprocessor 128 can then output control signals to ensure that up/down converter 100 tunes to the appropriate channel and that the appropriate information from the tuned channel is provided to the on-screen display 132. For example, if the selected virtual channel corresponds to a particular text data stream, the VBI data decoder is controlled to extract the text data stream, perform any necessary processing, and supply the data to the on-screen display control 132. Similarly, video and audio signals from the tuned channel may be processed and directed to the on-screen display control 132.

According to the present invention, virtual channels may be defined from the information included in the composite video signal. Accordingly, multiple services provided on the physical channel may be accessed using only a single tuner. FIG. 4A illustrates the display obtained from a virtual channel composed of video #1 and text stream #3. Simultaneous display of the various services corresponding to the defined virtual channel may be achieved using the overlay feature of the on-screen display control 132. For example, the on-screen display control 132 may overlay a selected one of the four video signals onto a selected one of the text streams. In such a case, the selected video may form the foreground and the selected text stream may form the background, or the reverse. In addition, the foreground and background may be divided by borders to frame the different portions of the picture. Further details concerning on-screen display control 132 operations that may be used to overlay of video and text the can be obtained from U.S. patent application Ser. No. 08/073,404, which is incorporated herein by reference.

FIG. 4B illustrates the display obtained from a virtual channel composed of video #3 and text #1. FIG. 4C illustrates the display obtained from a virtual channel composed of video #4 and text stream #2. Of course, FIGS. 4A–4C are intended to serve as examples and should not be considered limiting. Alternatively, two or more videos may be displayed simultaneously with text and/or graphics, and any portion of the display may have text overlayed on it. In fact, the system operator may define any combination of services on the selected bandwidth for display as a separate virtual channel.

Furthermore, the system operator may authorize the subscriber to create a desired multi-service display from the services available from a composite video signal. For example, a menu page may be provided to assist the subscriber in selecting video and text services from the composite video signal provided on a physical channel.

In addition, the subscriber may utilize two subscriber terminals coupled via their data ports 140. The subscriber terminals may operate in a master-slave relationship. Accordingly, the subscriber may further increase the viewing choices available by selecting a picture-in-picture display whereby one subscriber terminal tunes to one of the virtual channels defined from a composite video signal and the other subscriber terminal tunes to either a second defined virtual channel, another virtual channel, or a channel having a standard television signal. Alternatively, the subscriber may view information displayed from one of the tuners and record on a VCR, for example, information from the other subscriber terminal. Accordingly, the subscriber is afforded an extremely wide range of combinations of programming from only two frequency channels.

The text channel, EPG, and messaging capabilities of the subscriber television system will now be described. Text channels, EPG, and messages are transmitted as data from the headend 12 to the subscriber terminal 14 in, for example, the vertical blanking interval of the video portion, modulated on the audio carder, or via outband transmission. A further understanding of the techniques by which data may be transmitted can be obtained from U.S. patent application Ser. No. 07/983,766, entitled "In-Band/Out-of-Band Data Transmission Method and Apparatus for a Television System", which is incorporated herein by reference. Accordingly, the subscriber can access a variety of information that the system operator may offer, such as local news, sport shorts, cable account status, help screens for assisting the subscriber in using the subscriber terminal, and support of PPV capabilities, among other possibilities.

Text channels are virtual channels that may be selected by the subscriber like an ordinary channel, but are not associated with a real video channel of the broadband television signal. As discussed above, a text channel represents text data inserted into a television signal. When a text channel is selected, the corresponding data is read in real time from the data stream and displayed on the television display, for example, characters on a colored background. The data stream may contain a bit that controls whether or not the audio on that channel is muted. Accordingly, the system operator can provide music, news, or some other audio with text display.

In a preferred, yet nonetheless non-limiting embodiment, the text displayed on the screen will change as determined by the received transactions. The cable operator may control the rate at which the screen changes, for example, by controlling the data rate to the subscriber terminals or by other means. Accordingly, the subscriber would not be required to enter a control command in order to advance to the next page of text. Rather, the subscriber could view all of the pages of text simply by tuning to the appropriate virtual channel and waiting for all of the pages to appear. Of course, the system may also be configured to permit the user to control the advance of text pages.

The subscriber terminal is additionally capable of receiving an EPG that allows a subscriber to view a schedule of programming for the next several hours, where the number of hours depends upon the memory installed. The information is downloaded from the headend via transactions and is stored in memory. The subscriber terminal may be tuned to the EPG data channels whenever possible (e.g., when in "off mode," in certain menus, when the EPG is accessed) to keep the EPG database loaded to the maximum level and to replace programs already shown with new programs. Additional details of the EPG may be obtained from U.S. patent application Ser. No. 08/230,144, entitled "Pay-Per-View Electronic Programming Guide", filed Apr. 19, 1994 and incorporated by reference.

As discussed above, messages are addressably or globally sent from the headend 12 to the subscriber terminal 14. In effect, the subscriber terminal 14 serves as a personal mailbox between the subscriber and the system operator. A message is comprised of, for example, 16 screens having 16 lines of either 24 or 45 characters. For example, a maximum of 44 transactions would be required to download each 45×16 screen. The message characters may be defined in the on-screen display control character set. Further, the transmitted messages may use control characters and word representations in addition to single characters to increase information capacity and reduce memory requirements. Messages may indexed by a predetermined number of bits. For example, if a 24-bit number is used as an index, up to 16 million possible messages are enabled.

Preferably, messages are provided over one or more channels. The scrambler used transmit the messages is equipped with internal data RAM to store the message loop from the HEC so that the messages are retransmitted constantly to ensure reception. The serial nature of the system is such that as messages are added, the response time slows. However, the response time can be increased by providing additional message channels and/or by using text compression.

A subscriber terminal may be addressably assigned to any combination of groups, for example, 128 groups. A message definition transaction, which is preferably transmitted with all data streams, defines the display number for a particular address or group, the background color, and where to tune for the message. This information may be stored in the subscriber terminal RAM. When the subscriber terminal receives a message definition transaction for any group to which it belongs, the subscriber terminal will look for the message with the corresponding display number or other identifier. Message data may be read directly from the data stream or may be stored, in whole or in part, in memory, for example in RAM. Messages that have not been read may be given a higher priority than messages that have been read. Accordingly, if memory is limited, newly received messages may overwrite messages that have already been read out of memory. An LED on the front panel of the subscriber terminal and/or the display of a text message may indicate whether a new message has been received.

Figure 5A:
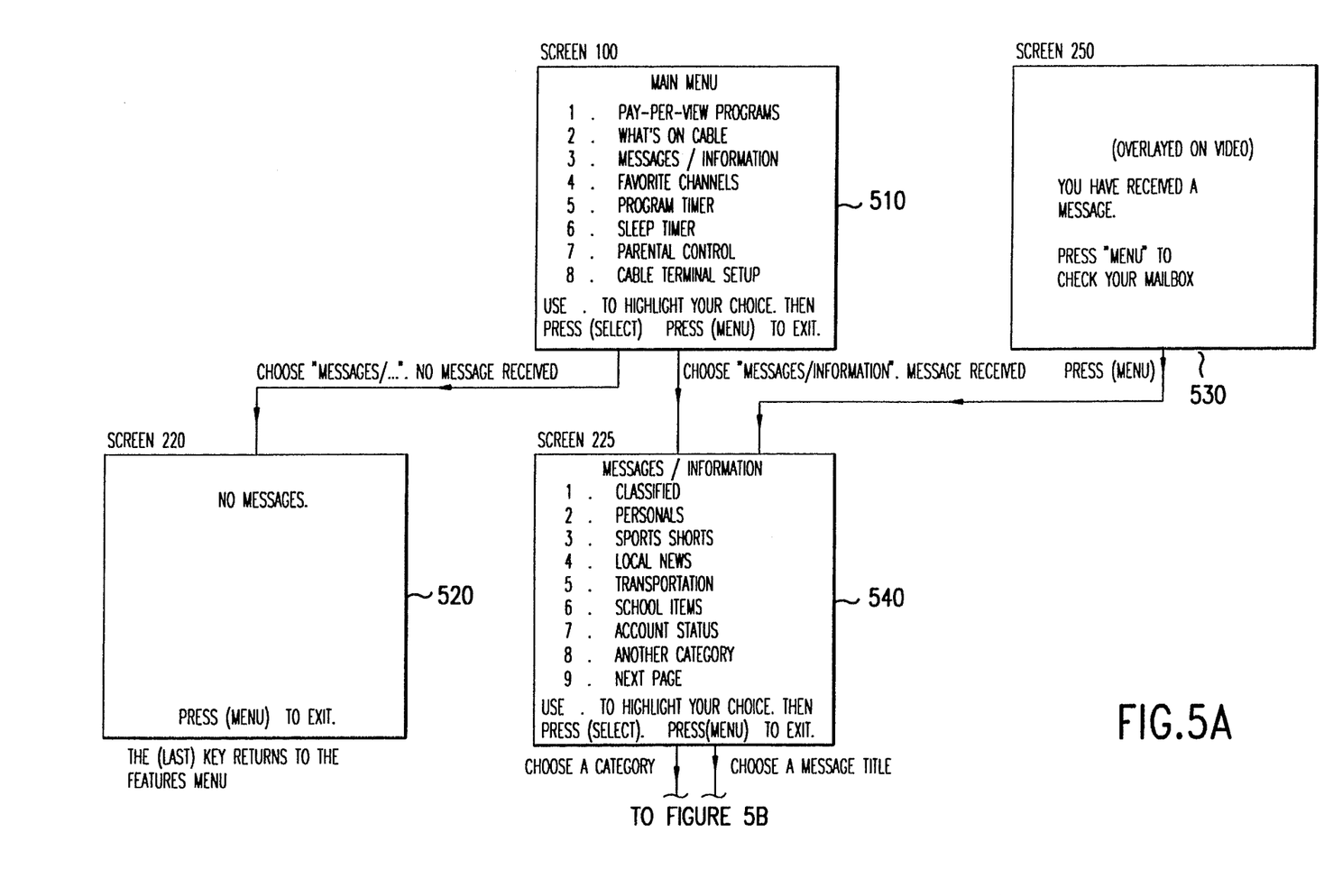
FIG 5A–5B illustrate the menu screen used in connection with the message processes.
Figure 5B:
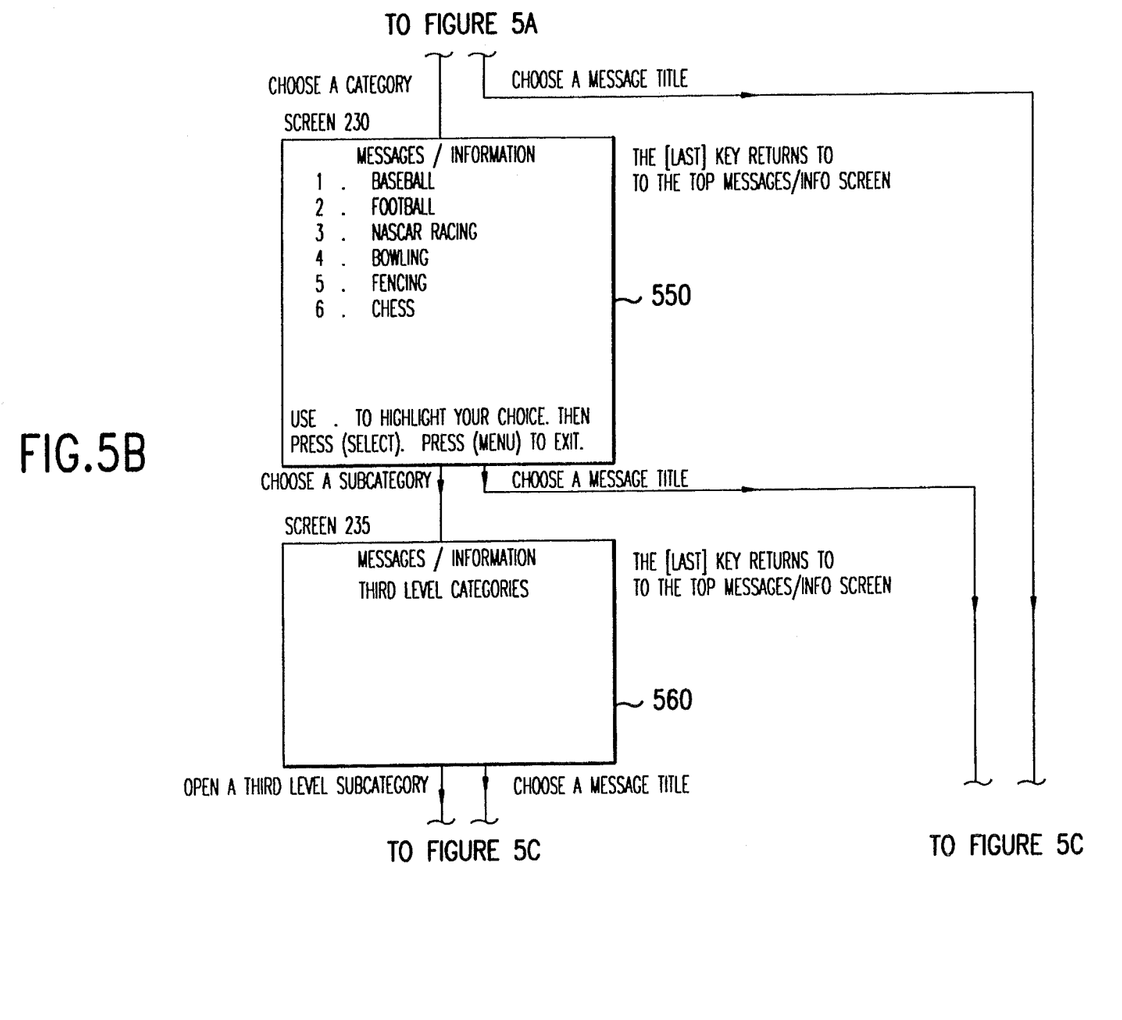
Figure 5C:
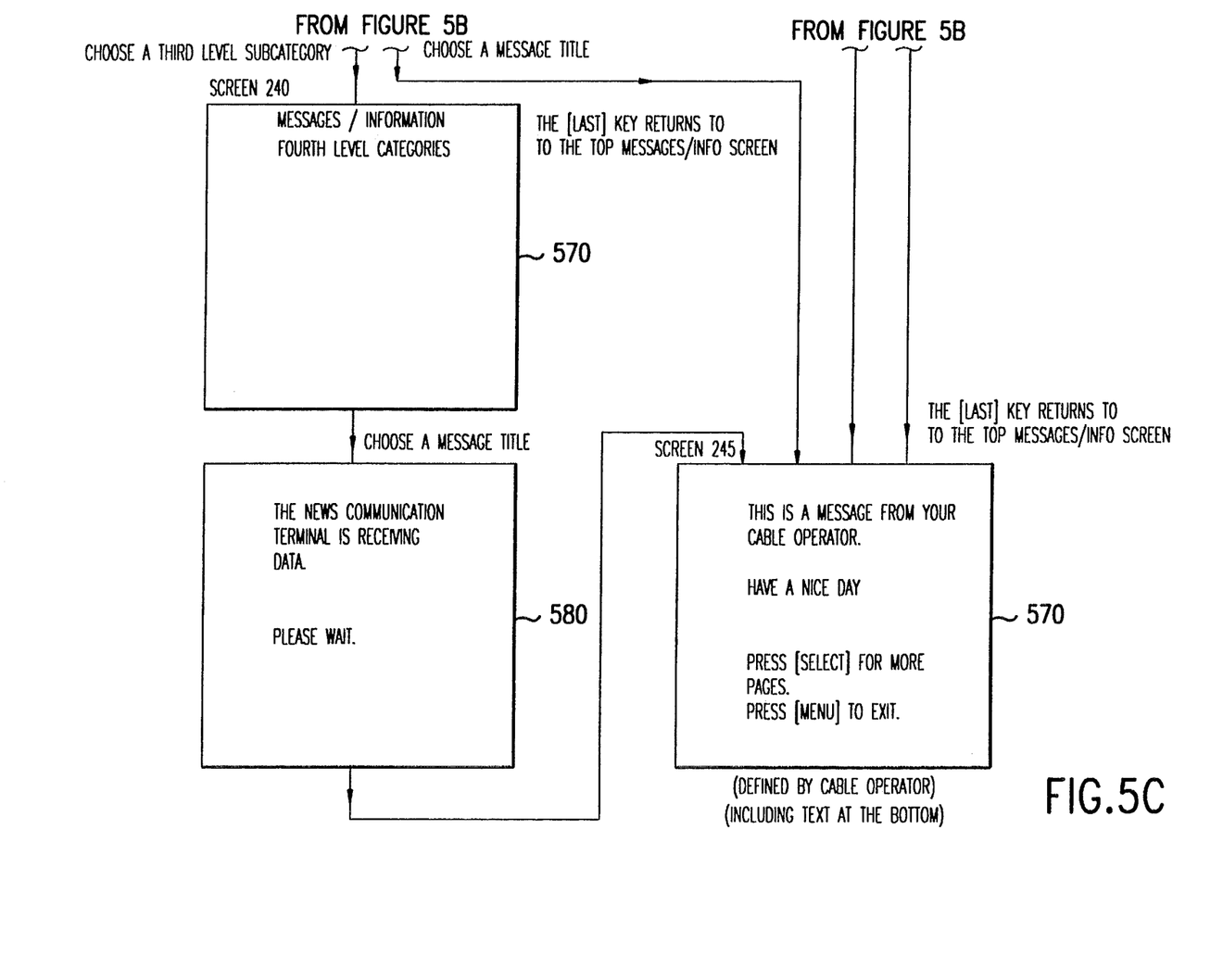

FIGS. 5A and 5B illustrate the menu screen used in connection with the message processes. The main menu screen 510 offers the subscriber a number of possible selections. A subscriber may read a message by, for example, selecting the "Messages/Information" option from the menu. If no messages have been received, screen 520 is displayed to indicate this status to the subscriber. If a message has been received, a screen 540 is provided to exhibit the various categories of messages available. Alternatively or in addition, a screen 530, indicating that a message has been received, may be overlaid on active video of program being viewed. By entering a "menu" key on the remote control or keyboard, a user may enter the screen 540.

Display 540 enables the subscriber to select from any of a number of message categories. The message categories may be used to associate message types and classifications with specific messages. The message categories are globally downloaded via global transactions and stored in volatile RAM. As illustrated further below, the message categories are built in a tree-like structure of categories so that a message may be found by searching specific lower categories. The subscriber is notified that a particular message category contains a message by, for example, use of an asterisk next to the appropriate category of course, another indicator may be used consistent with the present invention.

If the subscriber selects a category from screen 540, either the message is displayed as illustrated by screen 590 or second level categories are displayed by screen 550. In the example of FIG. 5A, when "Sports" is selected from screen 540, a screen 550 displays the various subcategories of "Sports" category, namely "Baseball", "Football", "Horse Racing", "Bowling", "Fencing" and "Chess". It should be clear that the subcategories listed are intended to be illustrative, and should not limit the invention.

When a subcategory is selected from screen 550, either a message is displayed as shown by screen 590 or third level categories are displayed as shown by screen 560. The subscriber terminal 14 is capable of supporting fourth level categories as illustrated by screen 570, or further subcategories. If a message has not yet been stored in memory, subscriber terminal 14 may display screen 580 to indicate to the subscriber that the message is in the process of being received.

The subscriber system and subscriber terminal described herein may be adapted to support digital television signals and compressed digital television signals, e.g. MPEG signals, as should be clear to those skilled in the art. When compressed digital television signal are utilized, bandwidth is available for carrying additional audio and/or data streams to thereby increase the number of options the present invention provides.

Although illustrative embodiments of the present invention have been described in detail with reference to the accompanying drawings, it is to be understood that the invention is not limited to those precise embodiments and that changes and modifications may be effected therein by those in the art without departing from the scope and spirit of the invention.

We claim:

1. A subscription television system comprising a headend for transmitting a broadband television signal and at least one subscriber terminal remote from said headend for receiving the broadband television signal via a distribution system, wherein:

said headend comprises:

a video combiner for combining a plurality of video signals, each corresponding to a different video program, to produce a composite video signal;

circuitry for inserting data streams into said composite video signal, each data stream corresponding to a different data service; and circuitry for modulating the composite video signal, including the data streams inserted therein, onto a channel of the broadband television signal, the broadband television signal being transmitted to said at least one subscriber terminal; and said at least one subscriber terminal comprising:

a selector for selecting a virtual channel from a plurality of virtual channels, each said virtual channel representative of a different combination of a video program and a data service;

control signal generating means, responsive to the selected virtual channel, for generating tuning control signals, data extraction control signals, and video program control signals corresponding to the selected virtual channel;

a tuner, responsive to said tuning control signals, for tuning to the channel of the broadband television signal carrying the composite video signal;

processing circuitry for processing the composite video signal received from said tuner, said processor circuitry including extracting means for extracting from said composite video signal a data stream determined from said data extraction control signals; and an on-screen display control, responsive to said video program control signals, for generating a video output display signal from said extracted data stream and said processed composite video signal to enable simultaneous display of the data service corresponding to said extracted data stream in a first continuous picture portion and the video program corresponding to the selected virtual channel in a second contiguous picture portion different from the first contiguous picture portion.

2. The subscription television system according to claim 1, wherein the data streams comprises text data streams representing text information.

3. The subscription television system according to claim 1, wherein said composite video signal comprises video signals of four video programs formatted such that each video program is located in a quadrant of a composite video signal picture.

4. The subscription television system according to claim 1, wherein said control signal generating means generates the data extraction signals and video program control signals according to information input by a subscriber, whereby the subscriber may select the data information and the video information for display.

5. The subscriber terminal according to claim 4, wherein: said on-screen display control generates a video output display signal formatted such that the video information appears in a quadrant of a displayed picture and data information appears in the remaining three quadrants of the displayed picture.

6. A subscription terminal for use in a subscription television system that transmits a broadband television signal including a composite video signal having video signals from a plurality of video programs and data streams, comprising:

a memory for storing a mapping of a virtual channel to a channel of the broadband television signal carrying the composite video signal and to a combination of a data stream and a portion of said composite video signal corresponding to a video program of said plurality of video programs;

a selector for selecting said virtual channel;

a tuner, responsive to the selected virtual channel, for tuning to the channel of the broadband television signal carrying the composite video signal stored in said memory;

processing circuitry for processing the composite video signal received from said tuner, said processor circuitry including circuitry for extracting from said composite video signal the data stream corresponding to the selected virtual channel; and an on-screen display control for generating a video output display signal from said extracted data stream and said processed composite video signal to enable simultaneous display of data information from said extracted data stream in a first continuous picture portion and the video program from the portion of said composite video signal corresponding to the selected virtual channel in a second continuous picture portion different from the first continuous picture portion.

7. The subscriber terminal according to claim 6, wherein the data streams comprises text data streams representing text information.

8. The subscriber terminal according to claim 6, wherein:

said memory additionally stores mappings of additional virtual channels to a channel of the broadband television signal carrying the composite video signal and to additional combinations of data streams and portions of said composite video signal corresponding to a video program of said plurality of video programs; and said selector is capable of selecting the additional virtual channels.

9. The subscriber terminal according to claim 6, wherein said composite video signal comprises video signals of four video programs formatted such that each video program is located in a quadrant of a composite video signal picture.

10. The subscriber terminal according to claim 9, wherein:

said on-screen display control generates a video output display signal formatted such that video information from the portion of said composite video signal corresponding to the video program appears in a quadrant of a displayed picture and data information from said extracted data stream appears in the remaining three quadrants of the displayed picture.

* * * * *